US007259379B2

(12) United States Patent
Wang et al.

(10) Patent No.: US 7,259,379 B2
(45) Date of Patent: Aug. 21, 2007

(54) ON-AXIS ELECTRON IMPACT ION SOURCE

(75) Inventors: Mingda Wang, Fremont, CA (US); Edward C. Cirimele, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 107 days.

(21) Appl. No.: 11/271,443

(22) Filed: Nov. 9, 2005

(65) Prior Publication Data

US 2006/0145072 A1 Jul. 6, 2006

Related U.S. Application Data

(63) Continuation of application No. 10/992,191, filed on Nov. 17, 2004, now Pat. No. 6,998,622.

(51) Int. Cl.
*B01D 59/44* (2006.01)
*H01J 27/00* (2006.01)
*H01J 49/26* (2006.01)

(52) U.S. Cl. ...................... 250/427; 250/288; 250/292; 250/293; 250/423 R

(58) Field of Classification Search ................. 250/427
See application file for complete search history.

(56) References Cited

U.S. PATENT DOCUMENTS

| | | | | |
|---|---|---|---|---|
| 5,942,752 | A * | 8/1999 | Wang | 250/288 |
| 6,627,883 | B2 * | 9/2003 | Wang et al. | 250/292 |
| 6,911,650 | B1 * | 6/2005 | Park | 250/292 |
| 6,919,562 | B1 * | 7/2005 | Whitehouse et al. | 250/288 |
| 6,998,622 | B1 * | 2/2006 | Wang et al. | 250/427 |
| 7,049,584 | B1 * | 5/2006 | Whitehouse et al. | 250/288 |
| 2002/0092980 | A1 * | 7/2002 | Park | 250/288 |
| 2004/0217284 | A1 * | 11/2004 | Malek et al. | 250/291 |
| 2005/0139760 | A1 * | 6/2005 | Wang et al. | 250/281 |
| 2006/0145072 | A1 * | 7/2006 | Wang et al. | 250/290 |

* cited by examiner

*Primary Examiner*—Robert Kim
*Assistant Examiner*—Bernard Souw

(57) ABSTRACT

An electron impact ion source includes an ionization chamber in which a first rf multipole field can be generated and an ion guide positioned downstream from the ionization chamber in which a second rf multipole field can be generated wherein electrons are injected into the ionization chamber along the axis (on-axis) to ionize an analyte sample provided to the ionization chamber.

10 Claims, 5 Drawing Sheets

ON-AXIS ELECTRON IMPACT ION SOURCE

CROSS-REFERENCE TO RELATED APPLICATIONS

The present application is a continuation of U.S. patent application Ser. No. 10/992,191, filed on Nov. 17, 2004 now U.S. Pat. No. 6,998,622.

FIELD OF THE INVENTION

The present invention relates to mass spectroscopy systems, and more particularly, but without limitation, relates to an electron impact (EI) ion source in which electrons are injected into an ionization chamber in the same direction in which ions leave the chamber (on-axis).

BACKGROUND INFORMATION

Electron impact ion sources produce analyte ions by exposing analyte molecules to a focused electron beam. In conventional ion sources of this type, electrons are injected into the ionization chamber in a perpendicular direction with respect to the longitudinal axis of the ionization chamber (the ion exit axis, or z-axis). In this configuration, a substantial percentage of the ions are formed off of the ion exit axis, and thus only a reduced portion of ions passes to the mass analyzer for detection. In gas chromatography mass spectrometer (GC/MS) systems, there is the further difficulty that space charges of carrier gas ions can also impede the focusing of ions near the ion exit axis.

Ion sources have been developed in which collisions between ions and a damping gas reduce the phase space distribution of the ions and focus the ions near the z-axis, increasing the transmission of ions to the mass analyzer. Electrons may be injected either parallel or perpendicular to the quadrupole field using this source, while ions are extracted along the axis of the quadrupole field. However, in order to avoid injected electrons from reaching the entrance of the mass analyzer, the ionization chamber has a comparatively great length (typically greater than 60 millimeters) with a correspondingly large surface area. The large surface area of the ionization chamber makes it infeasible to use the source in the analysis of low concentrations of polarized chemical species. Furthermore, the large ionization volume of the source can be unsuitable in rapid GC/MS analyses because the gas residence time in the ionization chamber is close to or longer than the length of the detected peaks.

To address this problem, what is needed is an on-axis ion source having an ionization chamber with a reduced area that includes means for preventing injected electrons from reaching the entrance of the mass analyzer.

SUMMARY OF THE INVENTION

To meet these needs, the present invention provides an ion source that includes an ionization chamber having a central axis in which a first rf multipole field can be generated and an ion guide positioned downstream from the ionization chamber in which a second rf multipole field can be generated. Electrons are injected into the ionization chamber along the central axis to ionize an analyte sample provided to the ionization chamber. In an embodiment of the present invention, the phase of the first rf multipole field is different from a phase of the second rf multipole field.

DETAILED DESCRIPTION

Figure 4:
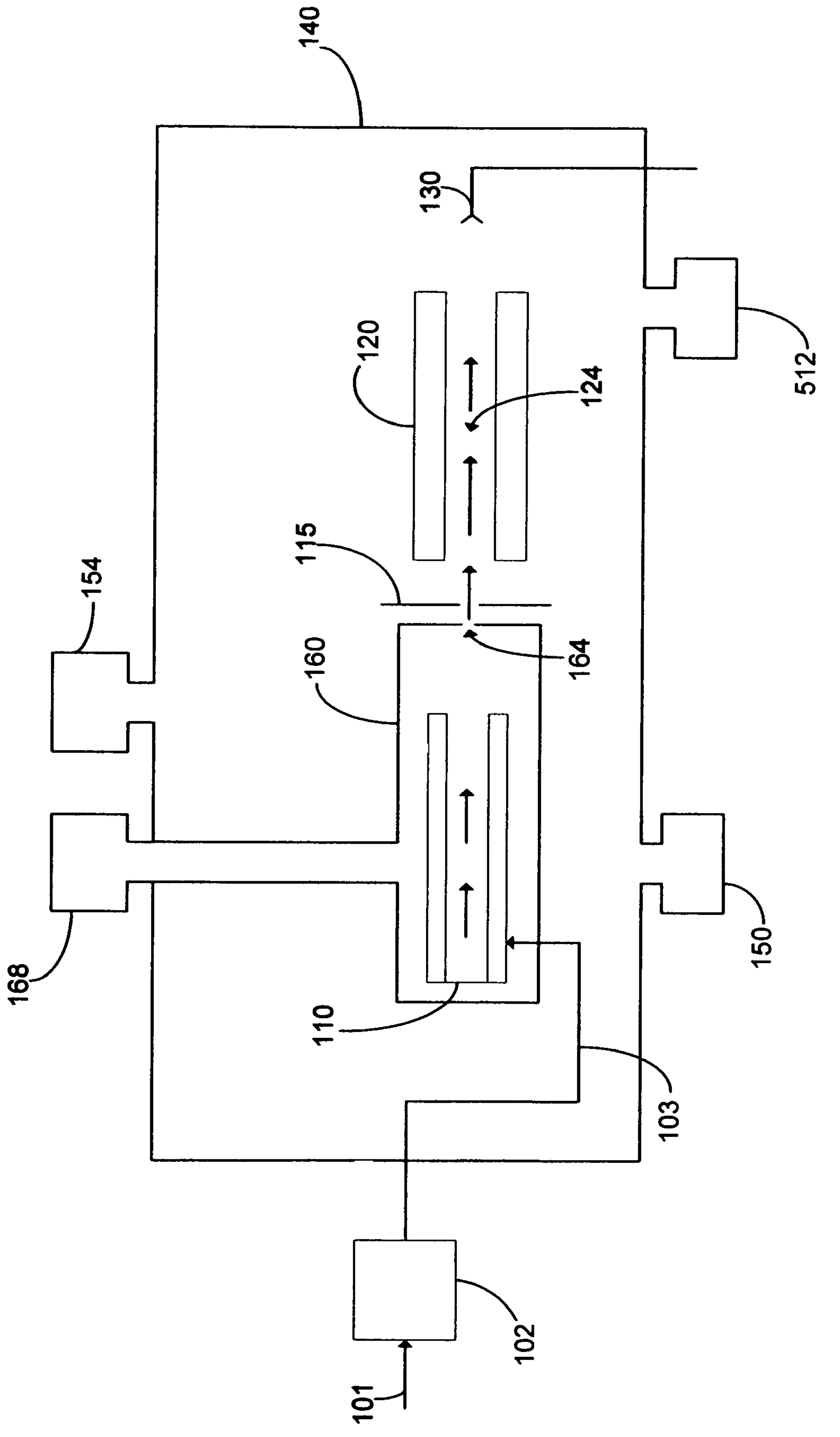
FIG. 4 shows a general GC/MS arrangement in which the ion source of the present invention may be applied.

An example arrangement of components of a GC/MS system is shown in FIG. 4. A charge-neutral liquid or gas sample 101, usually in solution, is vaporized, transported and optionally purified (separated) by gas chromatograph 102. The carrier gas of the gas chromatograph can be helium, hydrogen, nitrogen, neon, argon, for example. The charge-neutral sample gas/carrier gas mixture 103 proceeds into an RF (radio frequency) quadrupole ion source 110. Within the ion source 110, the sample gas is ionized into multiple ions by collision with electrons of a focused electron beam. The temperature in the ion source 110 may range between 20 and 350 degrees Celsius, and the pressure ranges between about $10^{-1}$ and about $10^{-4}$ torr. Sample ions and/or sample ion fragments emerge from the ion source 110 and move toward ion focus lens 115; as they do so the sample ions tend to converge to the central z-axis of the RF-field within the quadrupole due to collisional damping with carrier and/or damping gas. Additionally, carrier gas ions diverge from the central z-axis and collide with the electrodes because they are unstable in the RF field. The ions and ion fragments then pass through ion focus lens 115 into a mass analyzer, which may constitute an RF and DC quadrupole 120. The sample ions 124 travel through quadrupole 120 and are separated according to their respective mass-to-charge ratios by the RF and DC fields. The multiple ions are collected and detected using a detector 130 and are used to produce a mass spectrum. The entire system may be optionally enclosed in a housing 140 which is maintained under vacuum by pump 150 and optionally back up pumps 152 and 154.

Figure 1:
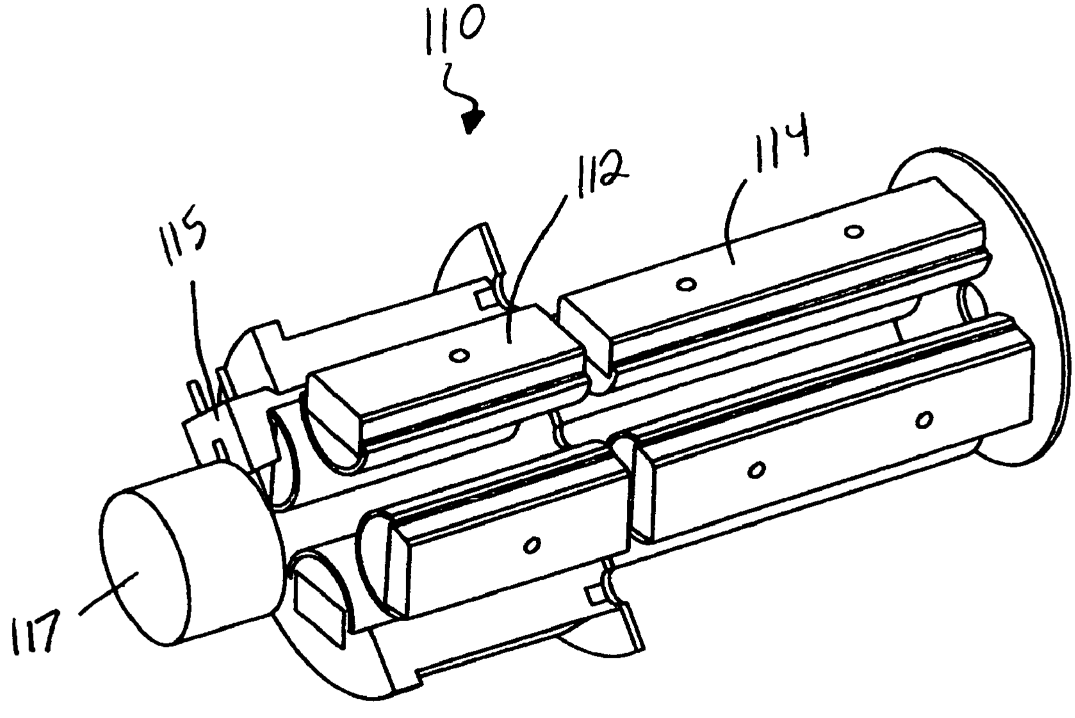
FIG. 1 shows a perspective view of a first embodiment of the on-axis electron impact ion source of the present invention.

As shown in FIG. 1, according to the present invention, the ion source 110 includes two sections, an ionization chamber 112 and an ion guide section 114, both of which are aligned along the z-axis. According to one embodiment of the present invention, rf fields are generated in both the ionization chamber 112 and the ion guide section 114. Electrons are generated at a filament 115 and confined as a high energy density electron beam by the action of a magnet 117, and injected into the ionization chamber 112 along the z-axis. Ions first move through the ion guide, where they are conditioned, and then enter the mass analyzer. Meanwhile, carrier gas ions are moved away from the central z-axis and collide with electrodes. The ionization chamber 112 is less than 60 mm in length along the z-axis. Electrons that overshoot the ionization chamber 112 enter the ion guide 114 and are strongly diverted by the rf field present therein.

The reduction of the length of the ionization chamber 112 to only a portion of the overall length of the ion source reduces the surface area and gas residence time in the ionization chamber without increasing neutral noise. The ion source 110 may also be enclosed in its own shell (housing) 160 (shown in FIG. 4) having an outlet 164 and vacuum or carrier and/or damping gas source 168. In this way, the pressure and gaseous content within ion source 110 can be made independent of the pressure or gas within container 140. The RF field in the ion source is usually operated between about 50 kHz and 5 MHz with amplitudes corresponding to cut off masses of 2 amu and up. An optional DC voltage of between plus and minus 200V may also be applied. Mass sizes for the charge neutral gas sample may range between about 4 and 2,000 atomic mass units (amu). The ions and/or ion fragments are obtained from these neutral molecules.

Figure 6:
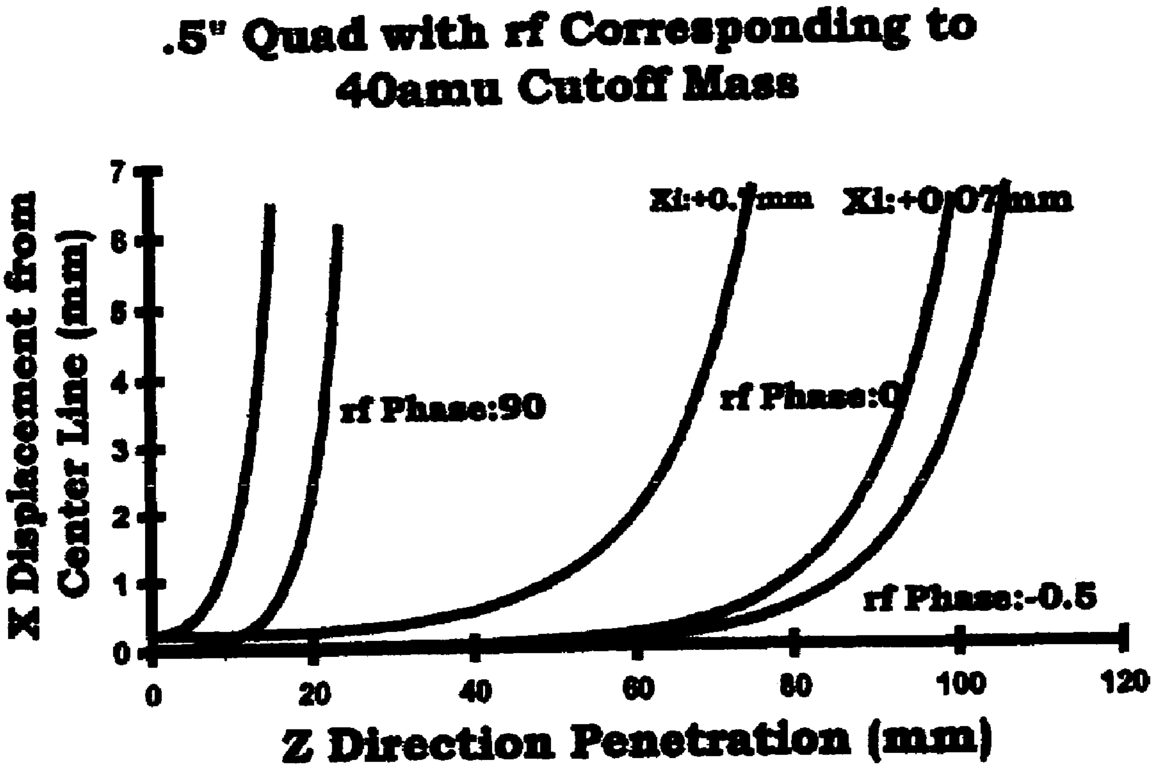
FIG. 6 is an exemplary graph of electron penetration along the z-axis under different initial conditions.

There are a number of different configurations and/or embodiments envisioned of the on-axis electron impact ion source according to the present invention. According to a first embodiment, the phase of the rf field in the ionization chamber 112 is set to be different from the phase of the rf field in the ion guide section 114. The phase difference further reduces the length of electron penetration. FIG. 6, which illustrates electron penetration under different initial conditions, shows how at a 90 degree phase difference between the rf fields of the ionization chamber and the ion guide, the z-direction penetration is markedly reduced in comparison to a zero phase shift. In another embodiment, the rf fields in both the ionization chamber 112 and in the ion guide 114 are higher order rf fields, such as hexapole, octopole, etc., or a combination of such higher order fields.

Figure 2:
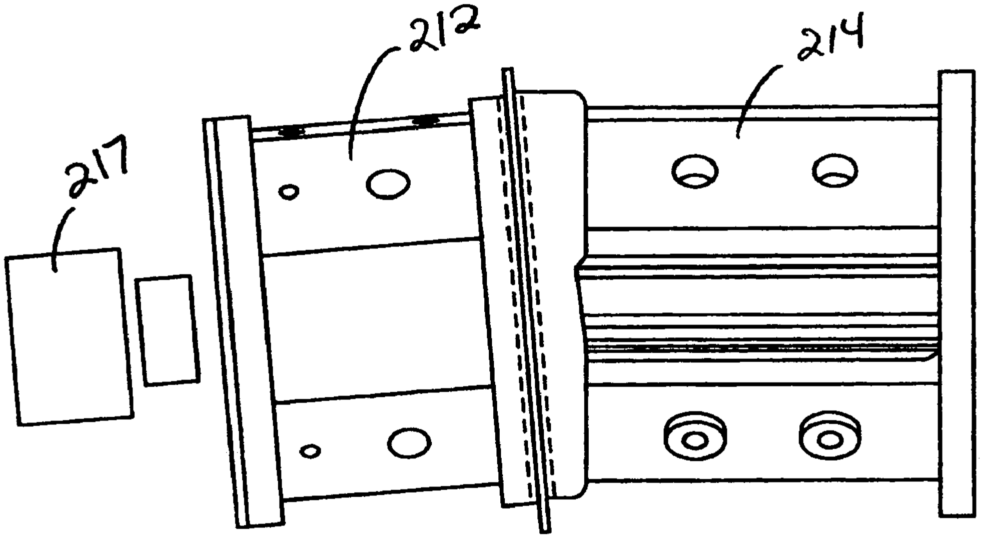
FIG. 2 shows a perspective view of a second embodiment of the on-axis electron impact ion source of the present invention.
Figure 3:
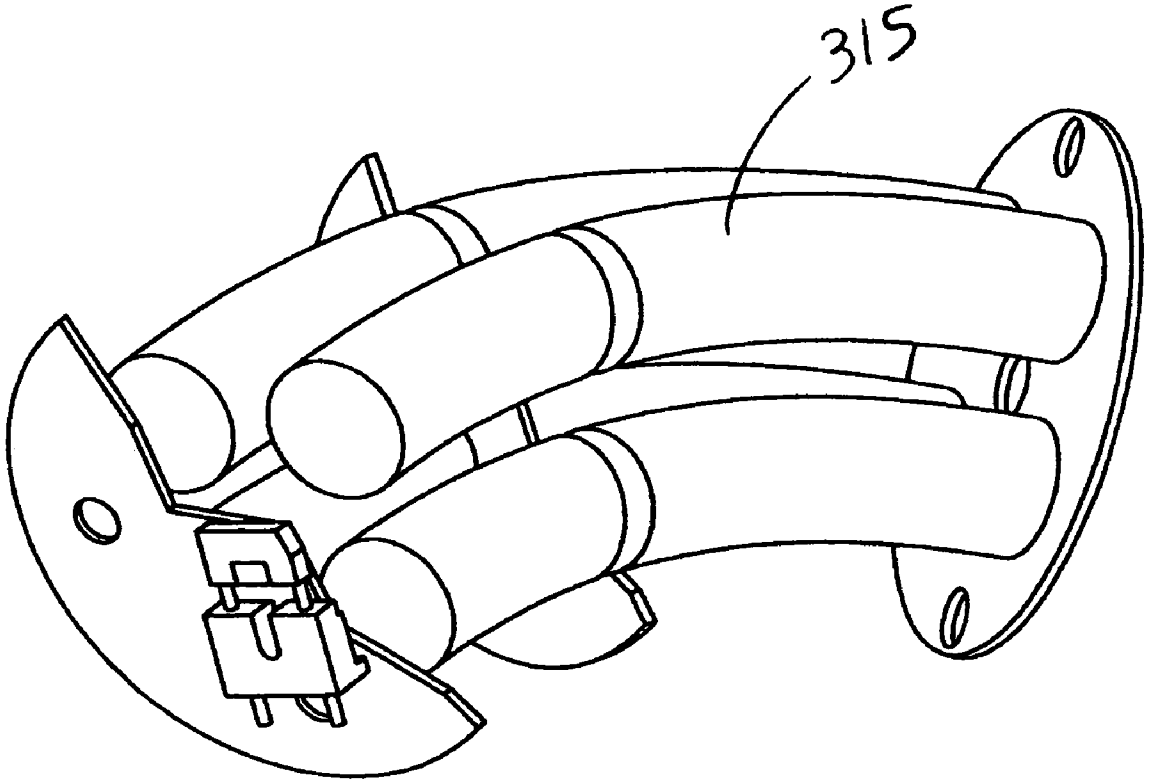
FIG. 3 shows a perspective view of an ion guide section used in a further embodiment of the on-axis electron impact ion source of the present invention.

In an alternative embodiment illustrated in FIG. 2, the z-axis of the ionization chamber 212 is tilted at an angle with respect to the z-axis of the ion guide 214. FIG. 3 shows a further embodiment in which the ion guide 314 includes curved electrodes 315. In this embodiment, electron penetration is further reduced and, in addition, the number of neutrals that reach the exit of the ion guide is also reduced, decreasing neutral noise and simultaneously increasing signal quality and resolution. In addition or alternatively, the ionization chamber may include curved electrodes that generate a curved quadrupole field. Since electrons tend to be destabilized by the quadrupole field and do not follow the path of the curved electrodes, they do not pass through the exit hole of the ionization chamber to the ion guide. On the other hand, sample analyte ions follow the curved quadrupole field and thus pass through the exit hole.

Figure 5:
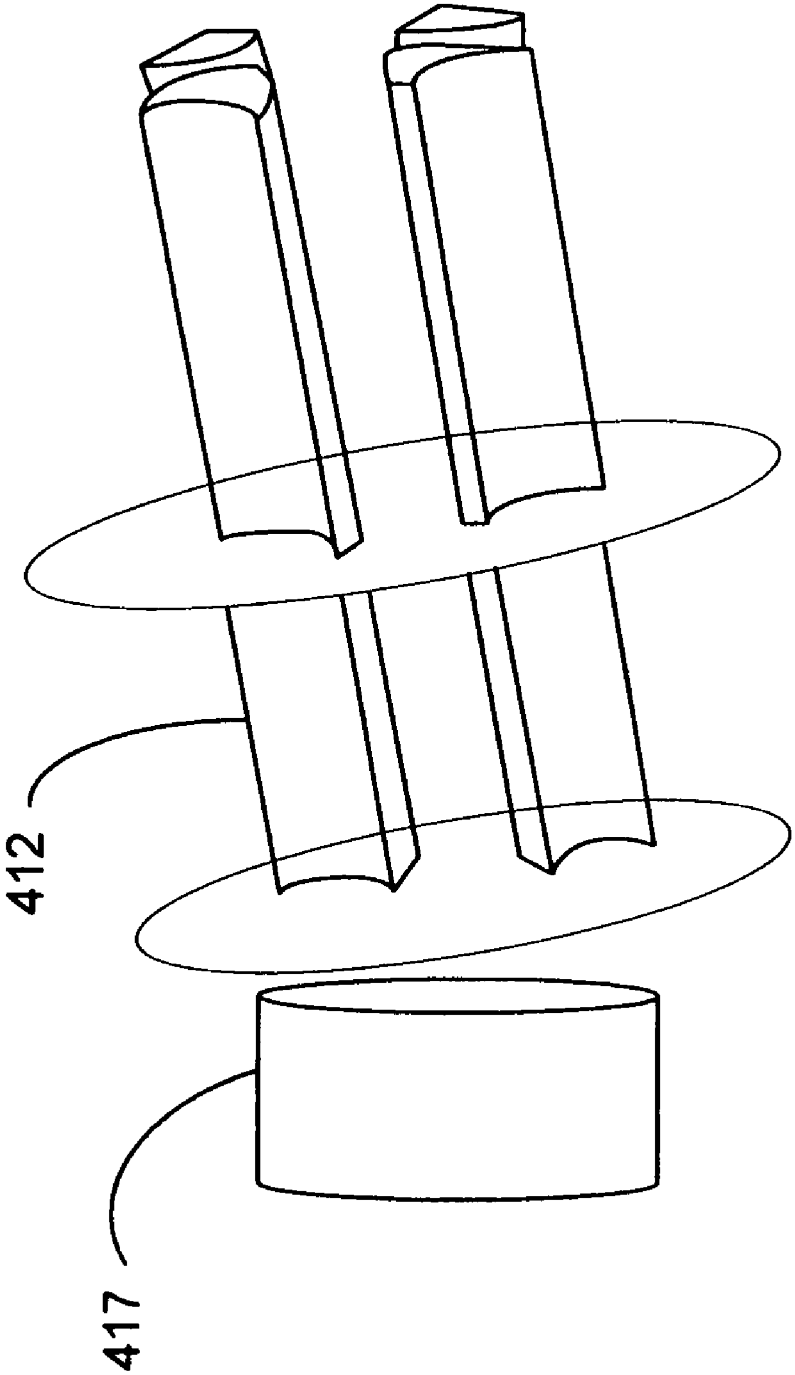
FIG. 5 shows a perspective view of a further embodiment of the on-axis electron impact ion source according to the present invention.

According to yet another embodiment of the ion source according to the present invention illustrated in FIG. 5, the magnetic field of the repeller magnet 417 is offset with respect to the z-axis of the quadrupole field within the ionization chamber 412. In this case, when the quadrupole electric field is strong, electrons are ejected by the quadrupole field, while when the quadrupole electric field is weak, electrons move along the magnetic field lines of the repeller magnet 417 and thereby miss the exit hole of the ionization chamber.

In a still further embodiment, the electron entry hole into the ionization chamber may be set slightly off-centered with respect to the central z-axis of the quadrupole electric field so that electrons are again unable to pass through the exit of the ionization chamber.

In the foregoing description, the invention has been described with reference to a number of examples that are not to be considered limiting. Each of the foregoing embodiments is found to improve sensitivity for mass spectrometry and other applications. Rather, it is to be understood and expected that variations in the principles of the method and system herein disclosed may be made by one skilled in the art and it is intended that such modifications, changes, and/or substitutions are to be included within the scope of the present invention as set forth in the appended claims.

What is claimed is:

1. An ion source, comprising:

an ionization chamber having a central axis in which a first rf multipole field is generated; and an ion guide having a central axis positioned downstream from the ionization chamber in which a second rf multipole field is generated;

wherein electrons are injected into the ionization chamber along its central axis to ionize an analyte sample provided to the ionization chamber, and wherein electrons that penetrate the ionization chamber and enter the ion guide are deflected away from the central axis of the ion guide by the second rf multipole field.

2. The ion source of claim 1, wherein a phase of the first rf multipole field is different from a phase of the second rf multipole field.

3. The ion source of claim 1, wherein the central axis of the ionization chamber and the central axis of the ion guide are aligned.

4. The ion source of claim 1, wherein the central axis of the ionization chamber and the central axis of the ion guide are not aligned.

5. The ion source of claim 1, wherein an axial length of the ionization chamber is less than half of an axial length of the ion guide.

6. An ion source comprising:

a first chamber having a first central axis in which a first rf multipole field is generated;

a second chamber positioned downstream from the first chamber having a second central axis, the second chamber including an ion guide in which a second rf multipole field is generated;

wherein electrons are injected into the first chamber along its central axis to ionize an analyte sample provided therein, and wherein a portion of the electrons injected penetrate the along the first central axis of the first chamber into the second chamber, and the second rf multipole field deflects the electrons away from the second central axis of the second chamber.

7. The ion source of claim 1, wherein a phase of the first rf multipole field is different from a phase of the second rf multipole field.

8. The ion source of claim 1, wherein the first central axis and the second central axis are aligned.

9. The ion source of claim 1, wherein the first central axis and the second central axis are not aligned.

10. The ion source of claim 1, wherein the electrons are injected into the first chamber at an angle with respect to the first central axis.

* * * * *